United States Patent [19]

Terao

[11] Patent Number: 5,539,538
[45] Date of Patent: Jul. 23, 1996

[54] FACSIMILE MACHINE HAVING A SINGLE FEEDING PATH FOR DOCUMENT AND RECORDING SHEET

[75] Inventor: Kenji Terao, Yokohama, Japan

[73] Assignee: Matsushita Graphic Communications Systems, Inc., Tokyo, Japan

[21] Appl. No.: 265,020

[22] Filed: Jun. 24, 1994

[30] Foreign Application Priority Data

Jun. 30, 1993 [JP] Japan ................................. 5-162151

[51] Int. Cl.⁶ ................................................. H04N 1/00
[52] U.S. Cl. ........................... 358/498; 358/472; 358/496
[58] Field of Search ............................. 358/471, 472, 358/496–498; 355/313, 317; 271/154, 155, 301, 304, 3.14, 4.01, 4.08; 346/145, 76 PH; 347/108; 493/320, 459; H04N 1/00

[56] References Cited

U.S. PATENT DOCUMENTS

| | | | |
|---|---|---|---|
| 4,496,984 | 1/1985 | Stoffel | 358/498 |
| 4,872,061 | 10/1989 | Uchiyama | 358/400 |
| 5,077,614 | 12/1991 | Stemmele et al. | 358/498 |
| 5,077,618 | 12/1991 | Takai et al. | 358/498 |
| 5,105,279 | 4/1992 | Kamada et al. | 358/498 |
| 5,265,152 | 11/1993 | Kotani et al. | 358/496 |
| 5,270,841 | 12/1993 | Watanabe | 358/496 |
| 5,295,002 | 3/1994 | Ishii etal. | 358/495 |
| 5,321,485 | 6/1994 | Nukaya | 358/498 |
| 5,346,457 | 9/1994 | Kimura | 493/320 |

*Primary Examiner*—Kim Yen Vu
*Attorney, Agent, or Firm*—Rossi & Associates

[57] ABSTRACT

A compact structure of a facsimile machine is provided. This facsimile machine includes a casing, a document-recording sheet inlet for insertion of a document and a recording sheet, a document-recording sheet outlet for ejection of the document and the recording sheet, a rotatable roller arranged in the casing to feed the document sheet and the recording sheet along a given path of travel extending from the document-recording sheet inlet to the document-recording sheet outlet, an image reading sensor for reading an image printed on the document moving along the given path of travel, and an image recording head for recording an image stored in an image memory on the recording sheet. The image recording means is arranged upstream of the image reading means along the given path of travel and urges the document and the recording sheet against the rotatable roller under a preselected pressure for providing thrust to advance the document and the recording sheet according to rotation of the rotatable roller along the given path of travel.

36 Claims, 2 Drawing Sheets

FACSIMILE MACHINE HAVING A SINGLE FEEDING PATH FOR DOCUMENT AND RECORDING SHEET

BACKGROUND OF THE INVENTION

1. Technical Field of the Invention

The present invention relates generally to a facsimile machine, and more particularly to a compact structure of a facsimile machine wherein a single feeding path for documents and recording sheets is defined effectively in limited space of a casing.

2. Background Art

In recent years, there has been proposed a facsimile machine which uses a single roller used for reading images from documents and printing transmitted images on recording sheets for miniaturization of the machine.

FIG. 3 shows an internal structure of such a facsimile machine. The facsimile machine includes generally a document tray 301, a feeding roller 302 for feeding documents to an image reading station, a contact image sensor 303, a reading-recording roller 304, a guide plate for guiding the documents to the image reading station, and an ejecting plate 306 for ejecting the documents whose images have been read to ejecting rollers 307. The facsimile machine further includes a roll of recording paper 308, a recording paper-pressing spring 310 for pressing recording paper 309 against the reading-recording roller 304, a thermal recording head 311, a recording head-pressing spring 312 for pressing the thermal recording head 311 against the roller 304.

During a record mode of operation, the thermal recording head 311 is urged by the spring 312 against the reading-recording roller 304 to record or print transmitted information data, or images on the recording paper 309 held on the reading-recording roller 304. The recording paper 309 is then ejected along a recording paper ejecting path C.

During a read mode of operation, the documents stacked on the document tray 301 are sequentially fed by the feeding roller 302 onto the guide plate 305 along a document feeding path D. The documents are then read by the contact image sensor 303 according to rotation of the reading-recording roller 304. After completion of the reading operation, the documents are guided by the ejecting plate 306 to the ejecting rollers 307 so that they are ejected outside the facsimile machine.

The above prior art facsimile machine, however, has suffered from a drawback in that since the recording paper ejecting path C and the document feeding path D are separate from each other, consuming a large mount of space in a casing, it is difficult to reduce the size of the machine.

In order to design a compact structure of a facsimile machine, it is necessary to arrange component parts of the machine effectively in a limited space of a casing while securing space sufficient to define paths of travel for recording paper and documents. The degree of compactness of the machine is also dependent upon arrangements of the paths of travel in the casing.

Additionally, as long as the recording paper ejecting path C and the document feeding path D are separate from each other, it is necessary to have four openings: document and recording paper inlets and document and recording paper outlets formed separately in both side surfaces of the casing, thereby restricting a reduction in size of the machine extremely.

SUMMARY OF THE INVENTION

It is therefore a principal object of the present invention to avoid the disadvantages of the prior art.

It is another object of the present invention to provide a compact structure of a facsimile machine wherein a single feeding path for documents and recording sheets is defined effectively in limited space of a casing.

According to one aspect of the present invention, there is provided a facsimile machine which comprises a casing, a document-recording sheet inlet formed in a first given area of the casing, a document-recording sheet outlet formed in a second given area of the casing, a feeding path extending from the document-recording sheet inlet to the document-recording sheet outlet, a rotatable roller arranged in the casing to feed a document sheet and a recording sheet along the feeding path, an image reading means for reading an image printed on the document sheet traveling along the feeding path, the image reading means being arranged in engagement with the rotatable roller, and an image recording means for recording an image on the recording sheet, the image recording means being arranged in engagement with the rotatable roller.

According to another aspect of the invention, there is provided a facsimile machine which comprises a casing, a document-recording sheet inlet formed in a first given area of the casing, a document-recording sheet outlet formed in a second given area of the casing, a feeding path extending from the document-recording sheet inlet to the document-recording sheet outlet, a feeding means for feeding a document sheet and a recording sheet along the feeding path, an image reading means for reading an image printed on the document sheet moving along the feeding path, the image reading means being arranged at a first location on the feeding path, and an image recording means for recording an image on the recording sheet, the image recording means being arranged at a second location on the feeding path.

According to a futher aspect of the invention, there is provided a facsimile machine which comprises a casing, a document-recording sheet inlet formed in a first given area of the casing for insertion of a document sheet and a recording sheet, a document-recording sheet outlet formed in a second given area of the casing for ejection of the document sheet and the recording sheet, a rotatable roller arranged in the casing to feed the document sheet and the recording sheet along a path of travel extending from the document-recording sheet inlet to the document-recording sheet outlet, an image reading means for reading an image printed on the document sheet moving along the path of travel, the image reading means being arranged at a preselected location on the path of travel, and an image recording means for recording an image on the recording sheet, the image recording means being arranged upstream of the image reading means along the path of travel and urging the document sheet and the recording sheet against the rotatable roller under a preselected pressure to provide thrust to advance the document sheet and the recording sheet according to rotation of the rotatable roller along the path of travel toward the document-recording sheet outlet.

In the preferred mode, the document-recording sheet inlet includes a guide plate which is oriented toward an outer surface of the rotatable roller.

The image recording means is arranged downstream of the guide plate on the path of travel to have an image recording position defined on the rotatable roller. The image reading means is arranged downstream of the image recording means to have an image reading position defined at a location on the rotatable roller perpendicular to the image recording position in a radial direction of the rotatable roller.

The image reading means is urged against the rotatable roller under a pressure smaller than the preselected pressure pressing the image recording means against the rotatable roller.

The image recording means is urged by a spring against the rotatable roller. The spring is disposed on a plate member mounted on an inner wall of the casing.

The document-recording sheet inlet and the document-recording sheet outlet are formed in the same surface of the casing to define the path of travel of substantially U-shape. Alternatively, the document-recording sheet inlet may be formed in an upper surface of the casing, while the document-recording sheet outlet may be formed in a side surface of the casing to define the path of travel of substantially J-shape.

The image reading means is so arranged as to read the image printed on the document sheet which is urged by the image recording means to be wrapped about the rotatable roller.

A paper straightening means may be provided for straightening the document sheet and the recording sheet which have been curled during traveling along the path of travel while being wrapped about the rotatable roller, the paper straightening means being provided on the document-recording sheet outlet.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for the purpose of explanation and understanding only.

In the drawings.

DESCRIPTION OF THE PREFERRED EMBODIMENT

Figure 1:
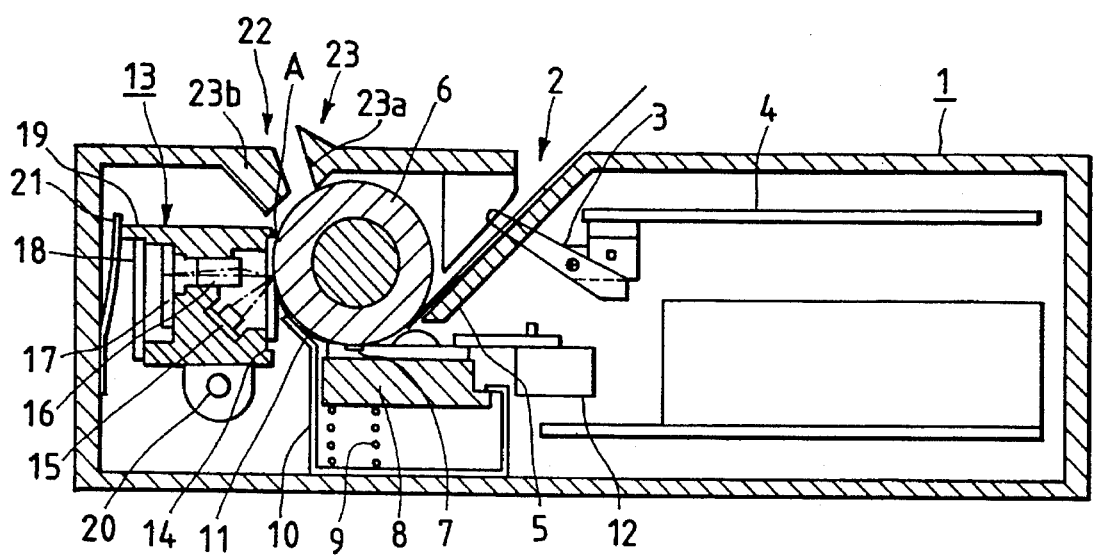
FIG. 1 is a cross-sectional view which shows an internal structure of a facsimile machine according to the present invention.

Referring now to the drawings, wherein like numbers refer to like parts in several views, particularly to FIG. 1, there is shown a facsimile machine according to the present invention.

The facsimile machine includes generally a casing 1, a paper sensor 3 mounted on a control circuit 4, a thermal head 7 having disposed thereon a heating element connected to the control circuit 4 through a connector 12, and an image sensor 13.

The casing 1 is made of a resin material and has a document-recording sheet inlet 2 formed in an upper surface thereof. The document-recording sheet inlet 2 includes a guide plate 5 which is oriented to the outer surface of the roller 6 for guiding documents and recording sheets onto the roller 6. The paper sensor 3 detects the presence of the documents and the recording sheets inserted into the document-recording sheet inlet 2 to provide a signal indicative thereof to the control circuit 4.

The thermal head 7 is urged against the roller 6 by a spring 9 through an aluminum base 8 under a pressure of 2 to 4 kg. During a record mode of operation, the thermal head 7 holds a recording sheet between itself and the roller 6 to heat a printing area of the recording sheet for printing images thereon. A metallic plate 10 is mounted on the bottom of the casing 1 to support the spring 9 for distributing a reaction force resulting from the action of the spring 9 on the aluminum base 8, on a given area of the bottom of the casing 1. This prevents the bottom of the casing 1 from being deformed locally to assure a given degree of spring force acting on the thermal head 7 through the aluminum base 8. Additionally, the metallic plate 10 includes an extension 11 functioning as a guide plate for guiding the document and recording sheet so that they may be wrapped about the roller 6 when passing through a contact area of the thermal head 7 with the roller 6.

The image sensor 13 is arranged downstream of the thermal head 7 on the path of travel A to have an image reading position defined at a location on the roller 6 shifted at about 45 deg from an image recording position of the thermal head 7 defined on the roller 6. The image sensor 13 includes a glass plate 14, an LED 15, a lens 16, a light-sensitive element 17, an image sensor driver 18, and an aluminum base 19. The image sensor 13 is pivotally supported by a shaft 20 and biased by a leaf spring 21 to press, for example, an A4 size document on the roller 6 under a pressure of about 500 g.

A sheet-straightening portion 23 is on an upper wall of the casing 1. The sheet-straightening portion 23 includes a flat surface 23a and a protrusion 23b extending inwardly to define a document-recording sheet outlet 22. The flat surface 23a serves to separate leading portions of the document and the recording sheet wrapped around the roller 6, while the protrusion 23b presses the reverse surfaces of the document and the recording sheet being separated from the roller 6 to direct them outside the casing 1 through the document-recording sheet outlet 22. In other words, the protrusion 23b curls the document and the recording sheet in a direction opposite the circumference of the roller 6 to straighten the document and the recording sheet when being ejected from the document-recording sheet outlet 22.

As clearly from the drawing, the guide plate 5, the roller 6, the guide plate 11, and the sheet-straightening portion 23 define a U-shaped single path of travel A along which the document and the recording sheet are advanced from the document-recording sheet inlet 2 to the document-recording sheet outlet 22.

In operation, when printing transmitted information data, or images stored in an image memory (not shown), a recording sheet is first inserted into the document-recording sheet inlet 2. The paper sensor 3 then detects the presence of the recording sheet and provides a signal indicative thereof to the control circuit 4. The control circuit 4 is responsive to the signal from the paper sensor 3 to output recording command signals to the thermal head 7 and the roller 6 through the connector 12 for initiating a recording operation. The recording sheet on the guide plate 5 is wrapped about the peripheral surface of the roller 6 and then moves along the path of travel A according to rotation of the roller 6. When the recording sheet reaches the thermal head 7, it is pressed thereby against the roller 6 to print thereon the transmitted images. The thermal head 7, as already mentioned, presses the recording sheet strongly against the roller 6 under a pressure of 2 to 4 kg, thereby holding the recording sheet firmly on the roller so that it is advanced without any slippage along the path of travel A according to the rotation of the roller 6. The recording sheet which has passed through the thermal head 7 is directed by the guide plate 11 toward the image sensor 13. The recording sheet is then advanced to the document-recording sheet outlet 22 while being pressed by the image sensor 13 against the roller 6. Upon arriving at the sheet-straightening portion 23, the leading portion of the recording sheet which has been curled around the circumferential surface of the roller 6 first hits on the flat surface 23a and then is lifted upward. The leading portion of the recording sheet being disengaged from the roller 6 is then pressed from the reverse surface thereof by the protrusion 23b to be curled in the opposite direction so that it is straightened out and ejected from the document-recording sheet outlet 22.

In a reading mode of operation, a document whose information data, or images are to be transmitted is, similar to the above recording operation, inserted into the document-recording sheet inlet 2. When the paper sensor 3 detects the presence of the document and provides a signal indicative thereof to the control circuit 4, the control circuit 4 outputs reading command signals to the roller 6 and the image sensor 13 for initiating the reading operation. The document is introduced between the thermal head 7 and the roller 6 so that it is thrust in a direction of rotation of the roller 6 along the path of travel A. The document is then directed by the guide plate 11 toward the image reading position of the image sensor 13. In the image reading position, the document is illuminated by the LED 15 of the image sensor 13 while being pressed by the spring 21 under the pressure of approximately 500 g so that light reflected from the document is focused onto the light-sensitive element 17 through the lens 16. The light-sensitive element 17 then outputs a signal indicative of the images printed on the document in accordance with intensity of the incident radiation, which is, in turn, stored in an image memory (not shown). During the reading operation, since the document is pressed against the roller 6 by the image sensor 13 under a pressure lower then that provided by the thermal head 7, it is successively separated from the outer surface of the roller 6 toward the document-recording sheet outlet 22. The document curled along the circumferential surface of the roller 6 is then, similar to the recording sheet, straightened out by the sheet-straightening portion 23 and ejected out of the casing 1.

As can be seen from the above discussion, a document sheet and a recording sheet are inserted from the same inlet and then ejected from the same outlet. Therefore, an area of the inlet and outlet occupying the outer surface of the facsimile machine may be reduced greatly as compared with the above mentioned conventional facsimile machine wherein two inlets and two outlets are formed in a casing, thereby enabling the machine to be miniaturized further.

Additionally, the U-shaped path of travel A permits the document-recording sheet inlet 2 and the document-recording sheet outlet 22 to be arranged in the same surface of the casing 1. It is very useful when only one surface of a facsimile casing is exposed to a user, for example, in the case where a facsimile machine arranged in a dashboard of an automotive vehicle or where a portable facsimile machine is used as it is placed in an attach'e case, for example.

In a copy mode of operation, images on a document to be copied are initially read in a similar manner to the above described image reading operation, storing the images temporarily in the image memory. Subsequently, a recording sheet is inserted into the document-recording sheet inlet 2 to print thereon the images stored in the image memory in the same manner as the above stated recording operation.

As apparent from the drawing, the path of travel A is of generally U-shape. Thus, feeding a document sheet and a recording sheet along the path of travel A requires turning them at any place along the circumferential surface of the roller 6 toward the document-recording sheet outlet 22. Accordingly, in this embodiment, the thermal head 7 is arranged upstream of the image sensor 13 on the path of travel A for providing a strong thrust enough to advance the document sheet and the recording sheet toward the document-recording sheet outlet 22 according to rotation of the roller 6. This prevents the document sheet and the recording sheet from jamming in the path of travel A.

Additionally, since the thermal head 7 functioning as a recording means and the image sensor 13 working as a reading means are both urged against the roller 6, it is possible to minimize the length of the path of travel A along the roller 6.

Figure 2:
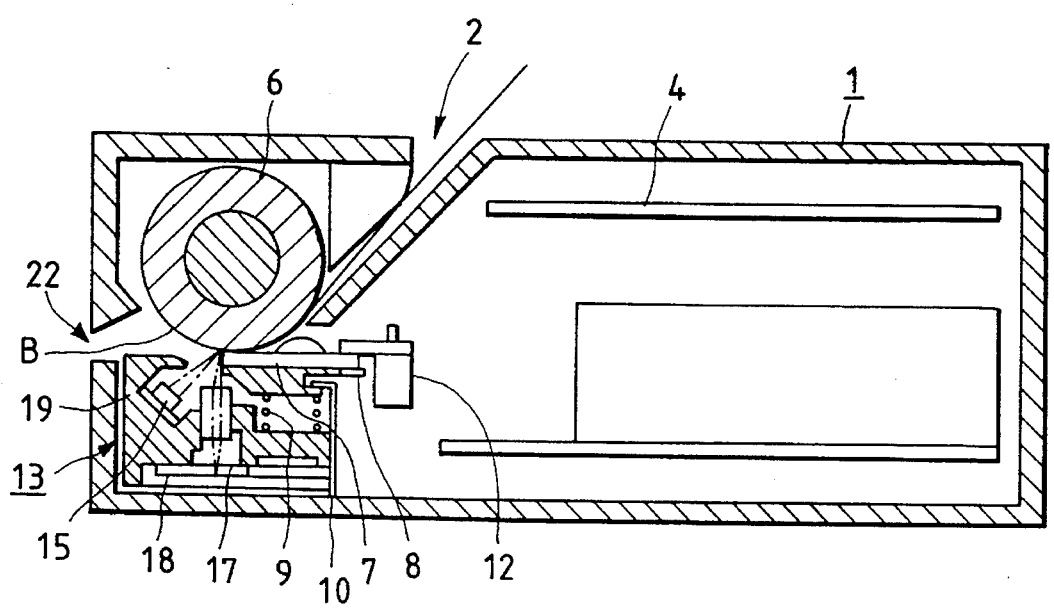
FIG. 2 is a cross-sectional view which shows an alternative structure of a facsimile machine of the invention.
Figure 3:
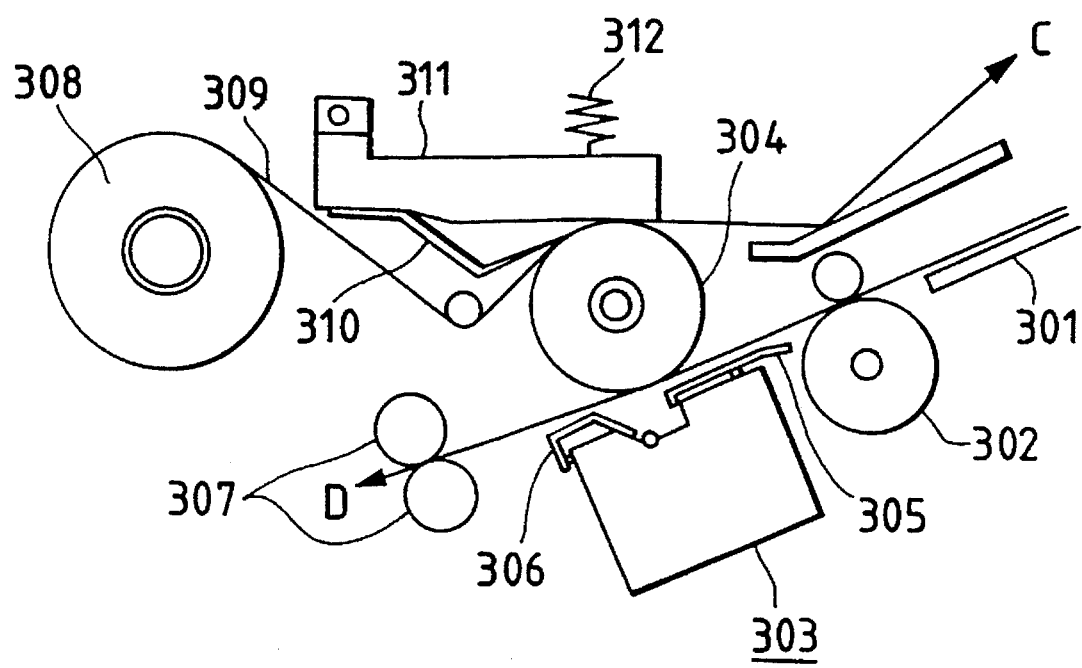
FIG. 3 is an illustration which shows a conventional facsimile machine.

Referring to FIG. 2, there is shown an alternative embodiment of the invention. The same numbers as employed in FIG. 1 refer to the same parts.

A document-recording sheet inlet 2 is formed in an upper surface of a casing 1, while a document-recording sheet outlet 22 is provided in a side surface thereof. A path of travel B is defined as generally J-shape. An image-reading section includes an image sensor 13 arranged adjacent a thermal head 7 and defines an image-reading position on a roller 6 near a printing surface of the heating element. The image-reading section and an image-recording section including the thermal head 7, an aluminum base 8, and a spring 9, are assembled in a metallic casing 10 as a unit. An aluminum base 19 is disposed on a lower corner of the casing 1 to support an LED 15 and to have the spring 9 disposed between itself and an aluminum base 8. The aluminum base 19 has a relatively great rigidity sufficient for withstanding a reaction force caused by urging the aluminum base 8 through the spring 9. The image sensor 13, unlike the one as shown in FIG. 1, does not have the glass plate 11.

In operation, when printing transmitted information data, or images stored in an image memory (not shown), a recording sheet is inserted into the document-recording sheet inlet 2. The recording sheet then engages the outer surface of the roller 6 so that it is advanced along the path of travel B according to rotation of the roller 6. Upon reaching the thermal head 7, the recording sheet is pressed against the roller 6 so that the images stored in the image memory are printed thereon. Subsequently, the recording sheet is separated from the roller 6 and then ejected outside the casing 1 from the document-recording sheet outlet 22.

In a reading mode of operation, a document sheet is, similar to the above recording operation, inserted into the document-recording sheet inlet 2. The document sheet is then advanced along the path of travel B according to rotation of the roller 6. When arriving at the image sensor 13, the images on the document sheet are read. During the image reading operation, the document sheet is held on the roller 6 by the thermal head 7, thereby eliminating the need for the glass plate 7.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A facsimile machine comprising:

a casing;

a document-recording sheet inlet, formed in a first given area of said casing, into which a document sheet and a recording sheet can each be inserted;

a document-recording sheet outlet, formed in a second given area of said casing, from which the document sheet and the recording sheet can each be ejected;

a common document-recording sheet feeding path extending from said document-recording sheet inlet to said document-recording sheet outlet, wherein said feeding path is of substantially U-shape;

a rotatable roller arranged in said casing to feed the document sheet and the recording sheet along said document-recording sheet feeding path;

image reading means for reading an image printed on the document sheet traveling along said feeding path, said image reading means being arranged in engagement with said rotatable roller; and image recording means for recording an image on the recording sheet, said image recording means being arranged in engagement with said rotatable roller.

2. A facsimile machine as set forth in claim 1, wherein said image recording means is arranged upstream of said image reading means on said feeding path.

3. A facsimile machine as set forth in claim 1, wherein said image reading means and said image recording means are disposed in a housing mounted in said casing.

4. A facsimile machine as set forth in claim 3, wherein said image recording means urges the document sheet against said rotatable roller, said image reading means reading the image printed on the document sheet urged by said image recording means against said rotatable roller.

5. A facsimile machine as set forth in claim 1, wherein said document-recording sheet inlet and said document-recording sheet outlet are formed in an upper surface of said casing.

6. A facsimile machine as set forth in claim 1, further comprising paper straightening means for straightening the document sheet and the recording sheet which have been curled during traveling along said feeding path while being wrapped about said rotatable roller, said paper straightening means being provided on said document-recording sheet outlet.

7. A facsimile machine as set forth in claim 1, further comprising curling means for curling the document sheet and the recording sheet in an opposite direction to said feeding path, said curling means being provided on said document-recording sheet outlet.

8. A facsimile machine as set forth in claim 7, wherein said curling means includes a flat surface and a protrusion, the flat surface being so arranged that leading portions of the document sheet and the recording sheet engage the flat surface, the protrusion being arranged opposite the flat surface over said feeding path to urge surfaces of the document sheet and the recording sheet opposite surfaces facing said feeding means.

9. A facsimile machine comprising:

a casing:

a document-recording sheet inlet formed in a first given area of said casing into which a document sheet and a recording sheet can each be inserted;

a document-recording sheet outlet formed in a second given area of said casing from which the document sheet and the recording sheet can each be ejected;

a rotatable roller arranged in said casing to feed the document sheet and the recording sheet along a path of travel extending from said document-recording sheet inlet to said document-recording sheet outlet;

image reading means for reading an image printed on the document sheet moving along the path of travel, said image reading means being arranged at a preselected location on the path of travel; and image recording means for recording an image on the recording sheet, said image recording means being arranged upstream of said image reading means along the path of travel and urging the document sheet and the recording sheet against said rotatable roller under a preselected pressure to provide thrust to advance the document sheet and the recording sheet according to rotation of said rotatable roller along the path of travel toward said document-recording sheet outlet;

wherein the document-recording sheet inlet and said document-recording sheet outlet are formed in the same surface of said casing to define the path of travel of substantially U-shaped.

10. A facsimile machine as set forth in claim 9, wherein said document-recording sheet inlet includes a guide plate which is oriented toward an outer surface of said rotatable roller.

11. A facsimile machine as set forth in claim 10, wherein said image recording means is arranged downstream of said guide plate on the path of travel to have an image recording position defined on said rotatable roller, said image reading means being arranged downstream of said image recording means to have an image reading position defined at a location on said rotatable roller perpendicular to the image recording position in a radial direction of said rotatable roller.

12. A facsimile machine as set forth in claim 11, wherein said image reading means is urged against said rotatable roller under a pressure smaller than the preselected pressure pressing said image recording means against said rotatable roller.

13. A facsimile machine as set forth in claim 11, wherein said image recording means is urged by a spring against said rotatable roller, said spring being disposed on a plate member mounted on an inner wall of said casing.

14. A facsimile machine as set forth in claim 9, further comprising paper straightening means for straightening the document sheet and the recording sheet which have been curled during traveling along the path of travel while being wrapped about said rotatable roller, said paper straightening means being provided on said document-recording sheet outlet.

15. A facsimile machine comprising:

a casing:

a document-recording sheet inlet formed in a first given area of said casing into which a document sheet and a recording sheet can each be inserted;

a document-recording sheet outlet formed in a second given area of said casing from which the document sheet and the recording sheet can each be elected;

a rotatable roller arranged in said casing to feed the document sheet and the recording sheet along a path of travel extending from said document-recording sheet inlet to said document-recording sheet outlet;

image reading means for reading an image printed on the document sheet moving along the path of travel, said image reading means being arranged at a preselected location on the path of travel; and image recording means for recording an image on the recording sheet, said image recording means being arranged upstream of said image reading means along the path of travel and urging the document sheet and the recording sheet against said rotatable roller under a preselected pressure to provide thrust to advance the document sheet and the recording sheet according to rotation of said rotatable roller along the path of travel toward said document-recording sheet outlet;

wherein said document-recording sheet inlet is formed in an upper surface of said casing, while said document-recording sheet outlet is formed in a side surface of said casing to define the path of travel of substantially J-shape.

16. A facsimile machine as set forth in claim 15, wherein said image reading means is so arranged as to read the image printed on the document sheet which is urged by said image recording means to be wrapped about the rotatable roller.

17. A facsimile machine comprising:

a casing having first and second surfaces;

a common document-recording sheet inlet path, opening to the first surface of said casing, into which a document sheet and a recording sheet can each be inserted, said common document-recording sheet inlet path being inclined at a given angle to the first surface;

a common document-recording sheet outlet path, opening to the second surface of said casing, from which the document sheet and the recording sheet can each be ejected;

a common document-recording sheet feeding path continuing from said common document-recording sheet inlet path to said common document-recording sheet outlet path;

a single rotatable roller disposed within said casing between the first surface and said common document-recording sheet feeding path to feed the document sheet and the recording sheet along said common document-recording sheet feeding path;

image reading means for reading an image printed on the document sheet traveling along said common document-recording sheet feeding path, said image reading means being arranged in engagement with said single rotatable roller; and image recording means for recording an image on the recording sheet, said image recording means being arranged in engagement with said single rotatable roller.

18. A facsimile machine as set forth in claim 17, wherein said image recording means is located downstream of said image reading means on said common document-recording sheet feeding path.

19. A facsimile machine as set forth in claim 17, wherein said image reading means and said image recording means are disposed within a housing mounted in said casing.

20. A facsimile machine as set forth in claim 19, wherein said image recording means urges the document sheet against said single rotatable roller to hold the document sheet on the rotatable roller, said image reading means reading the image printed on the document sheet held on the single rotatable roller by said image recording means.

21. A facsimile machine as set forth in claim 17 wherein said common document-recording sheet feeding path is of substantially U-shape.

22. A facsimile machine as set forth in claim 17, wherein the first and second surface of said casing lie flush with each other to form an upper surface of said casing.

23. A facsimile machine as set forth in claim 17, further comprising paper straightening means for straightening the document sheet and the recording sheet after having been curled by said single rotatable roller during travel along said common document-recording sheet feeding path, said paper straightening means being formed integrally with said document-recording sheet outlet.

24. A facsimile machine as set forth in claim 17, further comprising paper straightening means for straightening the document sheet and the recording sheet after having been curled by said rotatable roller during travel along said common document-recording sheet feeding path, said paper straightening means being formed integrally with a common document-recording sheet outlet of said common document-recording sheet outlet path.

25. A facsimile machine as set forth in claim 24, wherein said paper straightening means includes a protrusion and a flat surface, the flat surface being so provided as to direct leading edge portions of the document sheet and the recording sheet to cause the document sheet and the recording sheet to curl in a direction opposite the circumference of said single rotatable roller, the protrusion facing the flat surface across said common document-recording sheet outlet path to press reverse surfaces of the document sheet and the recording sheet which are opposite surfaces contacting said rotatable roller against the flat surface.

26. A facsimile machine comprising:

a casing having upper and side surfaces:

a common document-recording sheet inlet path, opening to the upper surface of said casing, into which a document sheet and a recording sheet can each be inserted, said common document-recording sheet inlet path being inclined at a given angle to the upper surface;

a common document-recording sheet outlet path, opening to the side surface of said casing, from which the document sheet and the recording sheet can each be ejected;

a J-shaped common document-recording sheet feeding path continuing from said common document-recording sheet inlet path to said common document-recording sheet outlet path;

a single rotatable roller disposed within said casing between the upper surface and said common document-recording sheet feeding path to feed the document sheet and the recording sheet along aid common document-recording sheet feeding path;

image reading means for reading an image printed on the document sheet traveling along said common document-recording sheet feeding path, said image reading mans being arranged in engagement with said single rotatable roller; and image recording means for recording an image on the recording sheet, said image recording means being arranged in engagement with said single rotatable roller.

27. A facsimile machine as set forth in claim 26, wherein said image reading means and said image recording means are disposed within a housing mounted in said casing.

28. A facsimile machine as set forth in claim 26, wherein said image recording means urges the document sheet against said rotatable roller to hold the document sheet on the single rotatable roller, said image reading means reading the image printed on the document sheet held on the single rotatable roller by said image recording mans.

29. A facsimile machine comprising:

a casing having an upper surface;

a common document-recording sheet inlet, formed in the upper surface of said casing, into which a document sheet and a recording sheet can each be inserted, said common document-recording sheet inlet path being inclined at a given angle to the upper surface;

a common document-recording sheet outlet, formed in the upper surface of said casing, from which the document sheet and the recording sheet can each be ejected in a direction substantially perpendicular to the upper surface of said casing;

a U-shaped common document-recording sheet feeding path extending from said common document-recording sheet inlet to said common document-recording sheet outlet;

a single rotatable roller, disposed within said casing so as to define through a circumference thereof a curved portion of said U-shaped common document-recording sheet feeding path, for feeding the document sheet and the recording sheet along said common document-recording sheet feeding path;

image reading means for reading an image printed on the document sheet traveling along said common document-recording sheet feeding path, said image reading means being arranged in engagement with said single rotatable roller opposite said single rotatable roller across said common document-recording sheet feeding path; and image recording means for recording an image on the recording sheet, said image recording means being arranged in engagement with said rotatable roller opposite said single rotatable roller across said common document-recording sheet feeding path.

30. A facsimile machine as set forth in claim 29, wherein said image recording means is located downstream of said image reading means on said common document-recording sheet feeding path.

31. A facsimile machine as set forth in claim 29, wherein said image reading means and said image recording means are disposed within a housing mounted in said casing.

32. A facsimile machine as set forth in claim 31, wherein said image recording means urges the document sheet against said single rotatable roller to hold the document sheet on the rotatable roller, said image reading means reading the image printed on the document sheet held on the single rotatable roller by said image recording means.

33. A facsimile machine as set forth in claim 29, further comprising paper straightening means for straightening the document sheet and the recording sheet after having been curled by said single rotatable roller during travel along said common document-recording sheet feeding path, said paper straightening means being formed integrally with said document-recording sheet outlet.

34. A facsimile machine as set forth in claim 33, wherein said paper straightening means includes a protrusion and a flat surface, the flat surface being so provided as to direct leasing edge portions of the document sheet and the recording sheet to cause the document sheet and the recording sheet to curl in a direction opposite the circumference of said single rotatable roller, the protrusion facing the flat surface across said common document-recording sheet feeding path to press reverse surfaces of the document sheet and the recording sheet which are opposite surfaces contacting said rotatable roller against the flat surface.

35. A facsimile machine comprising:

a casing having first and second surfaces;

a common document recording sheet inlet path, opening to the first surface of said casing, into which a document sheet and a recording sheet can each be inserted, said common document-recording sheet inlet path being inclined at a given angle to the first surface;

a common document-recording sheet outlet path, opening to the second surface of said casing, from which the document sheet and the recording sheet can each be ejected;

a common document-recording sheet feeding path continuing from said common document-recording sheet inlet path to said common document-recording sheet outlet path;

a single rotatable roller disposed within said casing to feed the document sheet and the recording sheet along said common document-recording sheet feeding path;

image-reading means for reading an image printed on the document sheet traveling along said common document-recording sheet feeding path, said image reading means being arranged in engagement with said single rotatable roller; and image-recording means for recording an image on the recording sheet, said image recording means being arranged in engagement with said single rotatable roller.

36. A facsimile machine comprising:

a casing;

a document-recording sheet inlet, formed in a first given area of said casing, into which a document sheet and a recording sheet can each be inserted;

a document-recording sheet outlet, formed in a second given area of said casing, from which the document sheet and the recording sheet can each be ejected;

a single rotatable roller arranged in said casing to feed the document sheet and the recording sheet inserted from said document-recording sheet inlet;

a common document-recording sheet feeding path communicating with said document-recording sheet inlet and said document-recording sheet outlet, said common document-recording sheet feeding path being curved from said document-recording sheet inlet to said document-recording sheet outlet passing through an outer peripheral surface of said single rotatable roller;

image reading means for reading an image printed on the document sheet traveling along said feeding path, said image reading means being arranged in engagement with said single rotatable roller; and image recording means for recording an image on the recording sheet, said image recording means being arranged in engagement with said single rotatable roller.

* * * * *

UNITED STATES PATENT AND TRADEMARK OFFICE
CERTIFICATE OF CORRECTION

PATENT NO. : 5,539,538

DATED : July 23, 1996

INVENTOR(S) : Jenji Terao

It is certified that error appears in the above-identified patent and that said Letters Patent is hereby corrected as shown below:

On the title page, item [73] Assignee should read :
--Matsushita Graphic Communication Systems, Inc.,--

Signed and Sealed this

Eighteenth Day of March, 1997

*Attest:*

BRUCE LEHMAN

*Attesting Officer*     *Commissioner of Patents and Trademarks*